United States Patent [19]

Denning

[11] 4,404,789
[45] Sep. 20, 1983

[54] ANIMAL EYE PROTECTION DEVICE

[76] Inventor: Elizabeth R. Denning, 47715 Rainbow Canyon Rd., Fallbrook, Calif. 92028

[21] Appl. No.: 291,246

[22] Filed: Aug. 10, 1981

[51] Int. Cl.³ .......................... B68C 5/00; A61F 9/04
[52] U.S. Cl. .......................................... 54/80; 2/15; 2/9
[58] Field of Search .................... 54/80, 81; 119/104, 119/142, 143; 2/4, 9, 15, 424, 427

[56] References Cited

U.S. PATENT DOCUMENTS

| | | | |
|---|---|---|---|
| 287,885 | 11/1883 | Sumner | 54/80 |
| 903,108 | 11/1908 | Rogers | 54/80 |
| 3,964,241 | 6/1976 | Allen et al. | 54/80 |

FOREIGN PATENT DOCUMENTS 111669 10/1940 Australia ............................ 119/143

Primary Examiner—Robert P. Swiatek
Attorney, Agent, or Firm—Jerry R. Seiler

[57] ABSTRACT

A device for protecting the eyes of a horse from insects comprises a cover member composed of a plurality of panels which cooperate to form an arched bubble spaced from the horse's eyes with the edge of the device lying around the front of the head below the ears and across the muzzle. The panels are made of a net-like material through which the horse can see, but which prevents insects, particularly flies, from entering the device.

11 Claims, 3 Drawing Figures

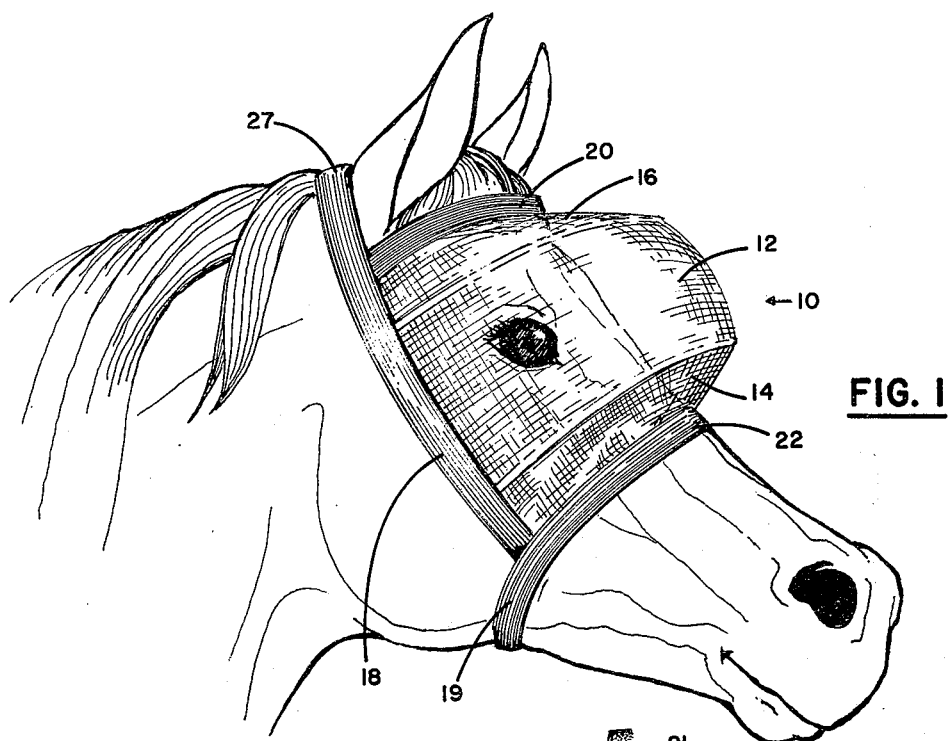
FIG. 1
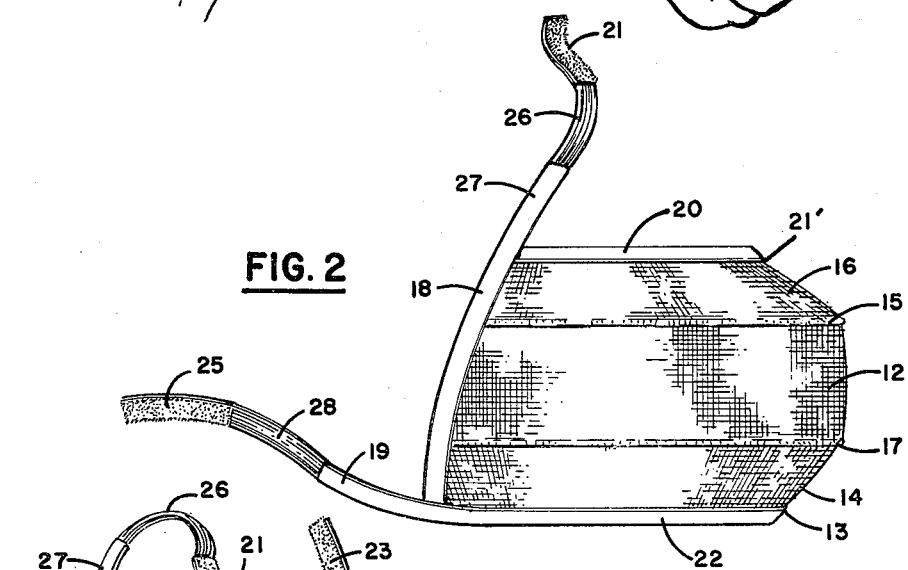
FIG. 2
FIG. 3

ANIMAL EYE PROTECTION DEVICE

BACKGROUND OF THE INVENTION

Devices for protecting the eyes of a horse from insects have been known heretofore. Flies are particularly undesirable, since they cause substantial irritation to the horse, as well as causing infection in the delicate tissues around the eyes. Previously known devices have not been satisfactory, either because they annoy the horse to the extent that the animal will rub the device against a tree or post, or the device will interfere with the horse's ears or with the horse's chewing. One such device is that disclosed in U.S. Pat. No. 3,753,334, which is quite bulky and has a number of straps extending around and along the horse's head, particularly around the nose, near the animal's mouth.

SUMMARY OF THE INVENTION

The present device fits snugly around the horse's head adjacent the eyes, and yet, composed of a plurality of panels, is spaced outwardly from the eyes so as to avoid injury to them, and at the same time protects the animal from insects such as flies, gnats, and the like. The panels are constructed in a unique way to achieve an arched, bubble-like effect. These as well as other advantages and features of the invention will be evident from the following detailed description.

BRIEF DESCRIPTION OF THE DRAWINGS

FIG. 1 is a side view showing the device of the invention secured to a horse's head;

FIG. 2 is a side view of the device showing particularly the relationship of the panels; and FIG. 3 is a front view of the device.

DETAILED DESCRIPTION OF THE INVENTION

The animal eye covering device of the present invention comprises a cover member 10 having a plurality of panels. In the preferred embodiment shown, the device comprises three panels, first and second panels 16 and 14, and third panel 12, respectively. The bottom panel 14 extends upwardly from a bottom edge 13 which is held somewhat snugly around the horse's head, below the eyes, and high enough on the face to prevent any interference with the movement of the horse's mouth. At the same time, the bottom edge of panel 14 is secured against the horse so as to leave little, if any, space therebetween whereby insects could get into the device. Similarly, upper panel 16 has a top edge 21 which is to be held around the horse's head above the eyes and below the ears, also in a manner to allow little, if any, space through which an insect could gain entrance to the interior of the panelled structure. The top edge of bottom panel 14 and the bottom edge of top panel 16 are secured to third panel 12. The manner of securing the panels is conveniently by sewing, forming seams 15 and 17 whereby the panels are secured together along the seam throughout substantially the entire length of the respective panel edges. Other means of securing the panel edges may be used including Velcro ® or other similar attaching means. The important feature of securing the various panel edges is that they must not project substantially inwardly toward the horse's eyes whereby edges or points could be jabbed into the eyes if the horse contacts or rubs the device against an object.

The top edge 21' of panel 16 and the bottom edge 13 of panel 14 are preferably secured in a binding as shown. Thus, binding strip 20 encloses top edge 21' of panel 16 while binding strip 22 similarly encloses edge 13 of the bottom panel. In this manner, the edge of material which is to be secured against the horse is uniform, and is relatively soft so that it can be urged snugly against the horse to prevent any substantial spaces through which insects could enter, and at the same time is comfortable and does not irritate the animal. Similarly, the opposite side edges on each of the side panels are cut so that they are aligned behind the horse's eyes and under the ears, the side edges also preferably being secured by binding strip 18, on both sides of the device. Although side edges for the upper and lower panels are shown, those panels may be cut or shaped so that the side edges may be eliminated. For example, top edge 21' of upper panel 16 may be cut so that it intersects directly with the bottom edge of that panel. Similarly, bottom edge 13 of panel 14 may intersect with the upper edge of the panel.

At the corners of the device are provided straps 19, 27, 31 and 33 (FIG. 3). These straps may be separately secured at the corners, or may be extensions of the binding strips. Thus, straps 19 and 33 may be extensions of binding strip 22 whereas strap 27 may be an extension of binding strip 18 and strap 31 is an extension of opposite binding strip 30. The binding strips and straps are conveniently sewn to the respective panels.

The device consists of at least three panels as shown, although more may be used if desired. Three or more panels are necessary so that at least an upper and lower panel, 16 and 14, extend angularly from the top and bottom edges of the device outwardly away from the horse's eyes where they intersect with and are secured to one or more arched center panels 12. Center panel 12 is arched outwardly from its opposite side edges, and is held in that arched condition by the supporting upper and lower panels which form the support between the respective upper and lower edges held against the animal's head, and the center panel. Thus, the upper and lower panels actually form the bridge or means for holding the center panel 12 in an arch-like manner spaced away from the horse's eyes. Such a feature prevents interference of the inner surfaces and seams with the horse, particularly around the eyes with seams 15 offering stability to the device so that it will stand out in an arched or bubble-like manner when placed on the animal's head. Again, more than one upper and more than one lower panel may be used, with those panels also being angled relative to one another, or lying in substantially the same plane as are the single panels 16 and 14.

Upper panel 16 lies substantially along a single plane from its upper edge 21' to its point of intersection with center panel 12 at seam 15; similarly, lower panel 14 lies generally along a single plane from lower edge 13 until it terminates at its upper edge at seam 17 with center panel 12. Thus, with center panel 12 lying generally along a vertical plane as the device is viewed, panels 16 and 14 each lie along respective different planes which intersect panel 12 at an acute angle. The angle between the plane of respective panels 16 and 14 and the plane of panel 12 may be different, or the same. However, that angle is an acute angle, less than 90°, and greater than 0°, the specific angle depending on the extent to which it is desired to have panel 12 separated or spaced apart from the horse's eyes when the device is secured in place on the animal.

A portion of the four straps are preferably provided with elastic means, as well as with means for securing them together. Observing particularly FIGS. 2 and 3, strap 27 includes an elastic portion 26 and fastening means 21 while opposite strap 31 includes fastening means 23. Such fastening means are conveniently releasable Velcro ® fasteners, so that the portions 21 and 23 may be easily secured as they are contacted, and similarly disengaged when pulled apart. One of the Velcro ® portions comprises a surface having a plurality of small hooks and the other portion having a surface of small fiber loops for engaging the hooks on contact. Such type fasteners are well known in the art and described, for example, in U.S. Pat. Nos. 2,217,432, 3,114,951, 3,130,111, and 3,083,737. Other fastening means such as snaps, buttons, and the like may also be used, if desired. Generally, strap 19 is provided with an elastic portion 28 and both straps 19 and 33 with cooperating fastening means 25 and 27, respectively.

Elastic present in at least one of the upper and lower straps is most preferable. With both the upper and lower straps having at least one elastic portion on one of the straps, a relatively snug and yet comfortable fit of the device along the binder and strip lengths is possible, and so the device will not become easily loosened, and yet is flexible even under varying weather and temperature conditions, with the elastic taking up or giving out some slack when necessary. This is particularly critical where the horse is likely to rub the device against an object in an attempt to remove it, so that with the elastic portion present, the relatively snug fit will remain intact. However, it is not desirable to have elastic portions on either of the binding strips 20 and 22, nor along the side binding strips 18 and 30, all of which are secured to the net material of the cover. To be effective, the material would have to be pleated or bunched where sewn to the unstretched elastic, which pleats would interfere with the overall efficiency of the panels in forming the desired panel structure shown.

Although in the preferred embodiment four straps are shown, and provided with disengageable fastening means, the upper and/or lower straps may be one strap rather than strap portions. For example, straps 27 and 31 may comprise a single strap, preferably having an elastic portion so that it can be pulled over the animal's ears; similarly, straps 19 and 33 may comprise a single strap, also preferably having an elastic portion. It will be appreciated that once the device is secured on an animal the upper and lower straps and side binding straps actually combine to form a single strap around the animal's head, behind the ears and under the jaw, with the binding strips 20 and 22 extending across the face between the straps along each side of the head.

It is necessary that at least the center panel 12 be made from a net-like material so that the animal can see through the center panel, which lies directly over the animal's eyes. The upper and lower panels could be made out of a different material, but are also preferably formed of a net-like material through which the animal can see. The size of the openings in the net-like material is critical only in that they should not only allow for relatively good vision for the animal, but at the same time prevent gnats, and particularly flies, from entering. Nylon netting is particularly preferred because of its strength whereby it is not easily worn through if the horse attempts to rub the device against an object, and at the same time is not affected by changing weather conditions so that it does not shrink, become discolored, or otherwise deteriorate.

The device is secured to a horse in a manner as illustrated in FIG. 1 with the upper straps 27 and 31 extending over the horse's ears, with binding strip 20 under the ears. The lower portion is secured underneath the horse's chin generally below the eyes, with straps 19 and 33 extending downwardly from the lower panel across the cheeks and connected together to form a single strap around the animal's head well behind the horse's mouth. Binding strip 22 lies below the horse's eyes, preferably only a few inches below, but high on the face to avoid interference with the mouth. Although the device is described particularly for use on a horse, it may be used for other animals, including dogs, cows, donkeys, and the like, and the description herein is not to be intended as limiting use for only a horse. Of course, different sized panels will normally be required for different sized animals. These as well as other advantages of the device as well as modifications within the purview of the invention may be evident to those skilled in the art.

I claim:

1. A device for protecting the eyes of an animal from inspects comprising:
   a cover member having a pair of opposite side edges and comprising first and second panels and a third panel therebetween, said first panel having a top edge adapted for lying against and around a portion of an animal's forehead below the ears and above the eyes and a lower edge secured to said third panel, said second panel having a bottom edge adapted for lying against and around a portion of the animals's head below the eyes and an upper edge secured to said third panel, said third panel forming an arched cover over said animal's eyes and held in a spaced relation therefrom by said first and second panels, said third panel comprising a net-like material having spaces therein to provide visibility therethrough, and
   means adapted for securing said cover member on said animal's head.

2. The device of claim 1 wherein said first and second panels comprise said net-like material.

3. The device of claim 1 including binding means along each of said side edges and including four straps, each extending from a different end of said opposite side edges, two of said straps comprising opposite upper straps, and two of said straps comprising opposite lower straps, said upper straps adapted for being secured together behind an animal's ears, and said lower straps adapted for being secured together under an animal's chin.

4. The device of claim 3 wherein at least one of said upper and lower straps includes an elastic portion.

5. The device of claims 3 or 4 wherein said upper and lower straps include disengageable fastening means.

6. The device of claim 1 including binding means along said top and said bottom edges.

7. The device of claim 1 wherein said first and second panels each lie generally along a first and second plane, respectively, said first and second planes intersecting said third panel at an acute angle of less than 90° and more than 0°.

8. An animal eye protection device comprising
   a cover member comprising a plurality of panels of netlike material having a mesh small enough to prevent passage of a fly therethrough, said panels forming an arched bubble over the animal's eyes, said cover member having top, bottom and side edges for lying against the animal's head, and wherein said panels comprise a top panel having an upper edge secured to a first binding strip, a bottom panel secured to a second binding strip, and a center panel secured between said top and bottom panels and on each side to a strap member, said strap member adapted to extend around the animal's head behind the ears and under the jaw, said side edges of said cover member being secured to said strap member, and said first and second binding strips adapted to extend across the animal's face between said strap member and secured thereto on each side of the animal's head, said first strip secured to said top edge of said cover member for lying against the animal below the ears and above the eyes, and said second strip secured to said bottom edge of said cover member for lying against the animal below the eyes.

9. The device of claim 8 wherein said strap member includes an elastic portion.

10. The device of claim 9 wherein said elastic portion is not secured to said cover member.

11. The device of claims 8, 9 or 10, wherein said strap member comprises upper and lower portions having disengageable fastening means.

* * * * *